Patented Mar. 27, 1923.

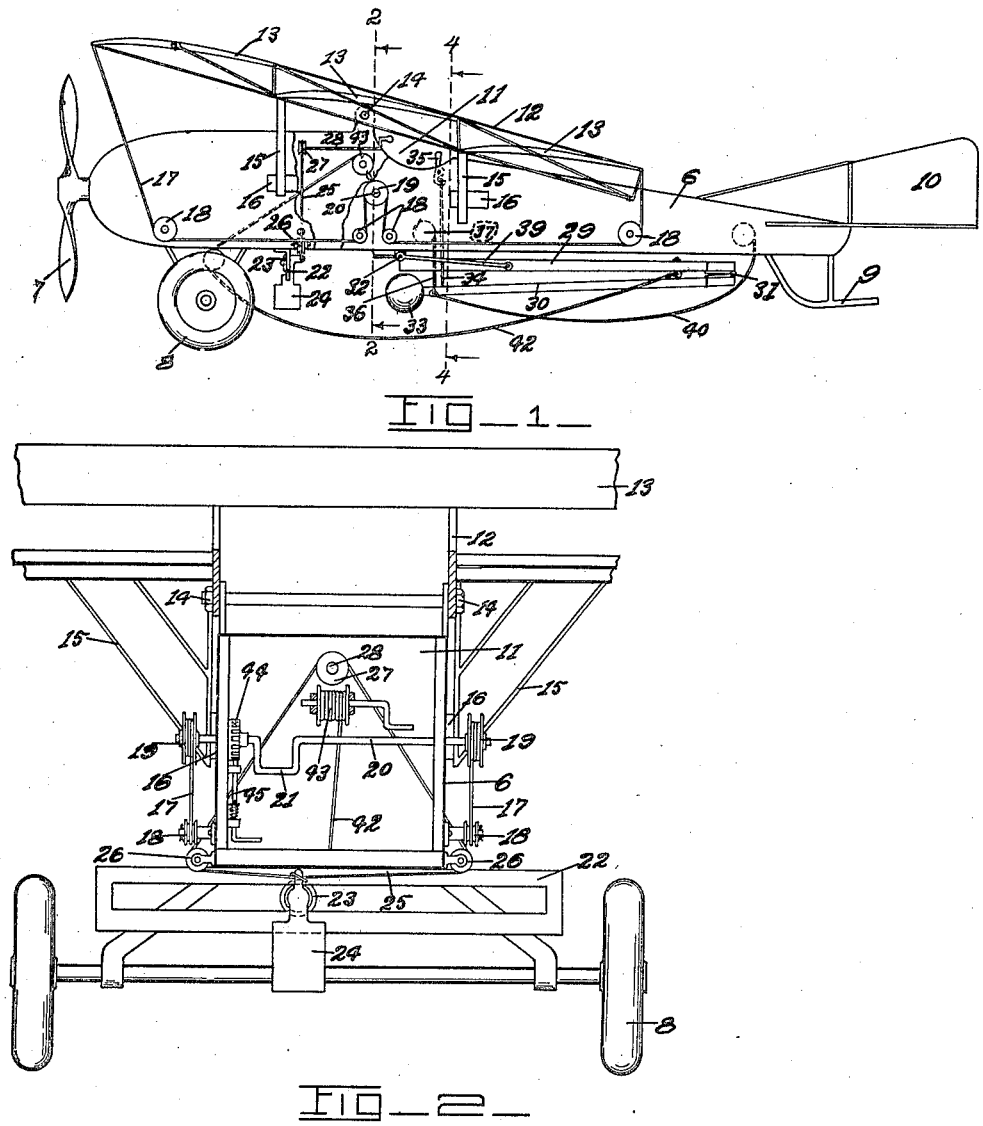

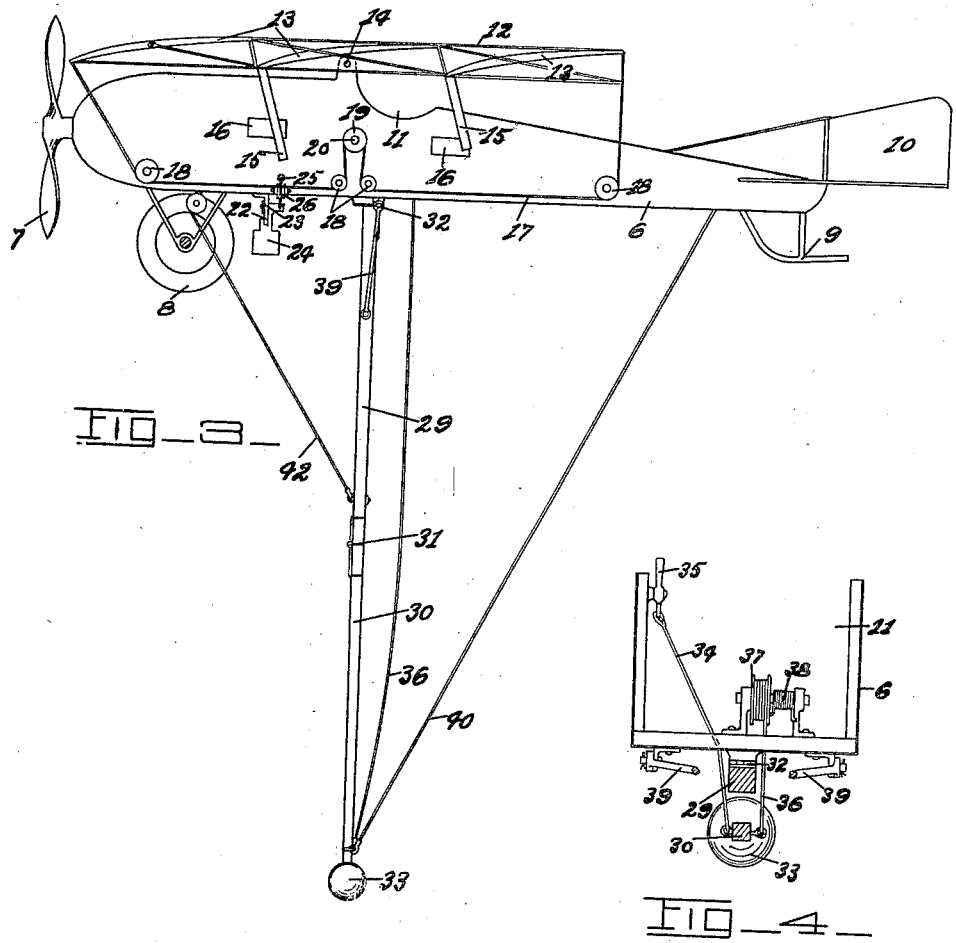

1,449,476

UNITED STATES PATENT OFFICE.

SOLOMON S. WHIPPS, OF MINNEAPOLIS, MINNESOTA.

AIRPLANE.

Application filed September 21, 1922. Serial No. 589,642.

*To all whom it may concern:*

Be it known that I, SOLOMON S. WHIPPS, a citizen of the United States, residing at Minneapolis, in the county of Hennepin and State of Minnesota, have invented certain new and useful Improvements in Airplanes, of which the following is a specification.

This invention relates to airplanes, and the main object is to provide a practical and efficient construction of airplane, in which is provided new and novel safety means for controlling its stability and balance in the air, either in the case of an unbalanced load, or where a forced landing is occasioned because of engine trouble or damage to the airplane itself. Further objects will be disclosed in the course of the following specification, are particularly included in the appended claims, and are illustrated in the accompanying drawings, wherein:

Fig. 1 is a side elevation of the airplane, embodying my invention, in flight, a fractional portion of the fuselage being broken away for illustration purposes.

Fig. 2 is an enlarged detail sectional view as seen substantially on the line 2—2 in Fig. 1.

Fig. 3 is an elevation of the machine illustrating the position of the various parts, when the safety means are released, so that the ship can glide to earth, when damaged or otherwise incapacitated for flying, with comparative safety Fig. 4 is an enlarged detail section on the line 4—4 in Fig. 1.

Referring to the drawings more particularly and by reference characters 6 designates the fuselage of an airplane having a propeller 7, landing rig 8, tail skid 9, rudder 10, and a cock pit 11, all of more or less common and well known construction The wings of the machine may be of any number or size, but I prefer, in this embodiment, to use a single wing frame or structure 12, in which are secured with relative rigidity three wings 13. The wings 13 lie in relatively parallel planes, but are inclined in the frame so that adjacent edges will be offset, as shown.

The frame 12 is transversely pivoted to the fuselage, as at 14, so that it can be tilted fore and aft, as the occasion may require. Brackets 15 are formed rigid with the frame 12 and slidably engage against plates 16, on the fuselage, so as to aid in supporting the wing frame when the machine is on the ground.

The front and rear edges of the wing frame are connected by a pair of controlling cables 17, which pass under idler pulleys 18, and are given several turns about drums 19. The drums 19 are secured on the ends of a shaft 20, having a handle crank 21, said shaft being transversely journaled in the fuselage within reach of the pilot when sitting in the cockpit. In Fig. 2 it may be noted that the shaft 20 is provided with a ratchet 44, which is engaged by a spring held foot released dog 45, the object of which is to enable the pilot to lock the wing frame in any angular position to which he adjusts it.

Secured under the fuselage is a transverse race member 22 in which is movably carried a roller 23 from which is suspended a weight 24, the position of which is slidably adjustable and determined by a cable 25 which passes over two idler pulleys 26 and a small spool 27, turned by the pilot through the medium of a crank 28.

A righting beam, consisting of two sections 29 and 30 hinged together as at 31, is hingedly secured to the underside of the fuselage, about under the center of its gravity, as at 32, and has a weight 33 at its outer or other end, when jackknifed or idle, as in Figs. 1 and 4, the righting beam is held up by a cord 34, but is quickly released, when necessary, by any suitable means such as a tripping lever 35. In order to prevent an excessive jar from the falling of the weight 33 to its lowermost position (see Fig. 3) I provide a cable 36, which is secured at one end to the beam section 30 and has its other end secured to and wound about a drum 37, which has a spring 38, of any suitable construction, to prevent a too speedy unwinding. A pair of link bars 39 are pivoted to the beam section 29 and to the sides of the fuselage, and swing with and on the same center as the beam section 29, and their object is to prevent relative transverse rocking motion between the righting beam and the airplane when the former is down.

A rear retaining cable 40 is secured at one end to the beam section 30, near the weight 33, and has its other end secured to the rear end of the machine, preferably being wound on a spool 41 so that it can be conveniently rolled up when not in use. The length of this cable is such that it will allow the righting beam to straighten out in a perpendicular direction with respect to the fuselage.

A front retaining cable 42 is secured at its lower end to the beam section 29, near the hinge 31, and its object is to keep the joint straight and prevent the weight 33 from swinging backward, when lowered. As this cable must be shortened when the beam is released, to become taut, its upper end is wound upon a hand operated drum 43, which is also within easy reach of the pilot.

The operation and function of the machine and its various parts will now be briefly set forth, as follows:

As the airplane takes to the air and flies about after ascending the various parts above described are substantially in the relative positions indicated in Fig. 1. Slight adjustments of the wing frame pitch and the weight 24 can be made according to the speed, altitude, placing of load carried, etc., as is found necessary or desirable.

Assuming now that the pilot loses control of the machine, for any reason whatever, the natural tendency of the machine would be to plunge into a nose dive and crash to the earth, as is so often the case. To meet such a contingency, in this case, he first immediately trips the lever 35. As the weight 33 then drops down, to the position shown in Fig. 3, he reels in the cable 42, thus bracing the righting beam, and simultaneously releases the dog 45 and pulls the front end of the wing frame 12 down. If either side of the wings have been damaged or become broken, he then moves the weight 24 over to the other side, thus better distributing the load where it can best be carried, or he may move this weight to tilt the machine sidewise and thus cause it to descend in a spiral.

Because of the extended length of the righting beam the weight 33 will now act much like the load in a parachute, keeping the fuselage substantially horizontal at all times and thus preventing the dreaded nose dive to certain destruction.

The wings 13 will of course have a great resistance against the downward drop, and are only inclined forwardly enough to cause a forward movement to be imparted to the machine. It may thus be steered to the best landing place the pilot might observe. Upon nearing the earth the drum 43 may be released so that the righting beam will not interfere with landing.

It is understood that suitable modifications may be made in the general design and structural details of this machine, when found desirable or necessary; provided, however, that such modifications come within the spirit and scope of the appended claims. Having now therefore fully shown and described my invention, what I claim to be new and desire to protect by Letters Patent is:

1. In an airplane of the character described having a fuselage, supporting wings tiltably mounted on a transverse pivot above the fuselage, a righting beam hingedly secured at one end to the underside of the fuselage, a weight at the other end of the beam, said beam having a joint so that it can be doubled up and secured in horizontal position under the fuselage.

2. In an airplane of the character described having a fuselage, a righting beam hingedly mounted at one end under the fuselage and having a weight at the other end, said beam having a folding joint at substantially its middle to allow the beam to be folded up in a longitudinal direction with respect to the fuselage, and means for bracing said beam in a rigid perpendicular position below the fuselage.

3. In an airplane of the character described having a fuselage, a righting beam hingedly secured at one end under the fuselage at approximately the center of gravity of the airplane, a weight secured to the other end of the beam, a folding joint at approximately the middle of the beam, so that it may be folded against itself with its ends together, and releasable means for holding the beam up in folded position under the fuselage.

In testimony whereof I affix my signature.

SOLOMON S. WHIPPS.